May 11, 1948.   L. KERIAN   2,441,154
SORTING MACHINE WITH ENDLESS CONVEYOR GAUGING SLOTS
Filed March 1, 1945   3 Sheets-Sheet 1
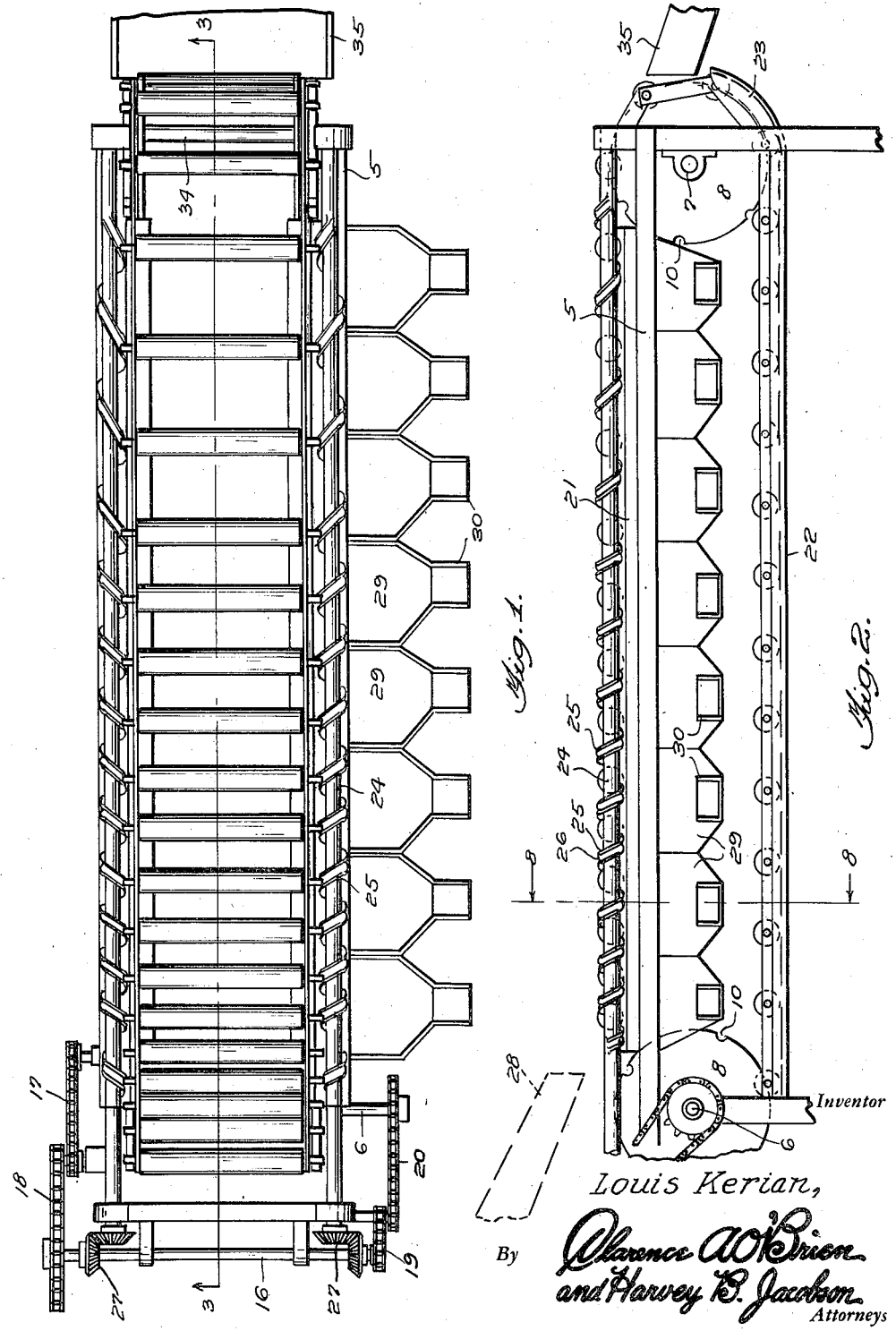
Louis Kerian, Inventor
By Clarence A. O'Brien and Harvey B. Jackson, Attorneys

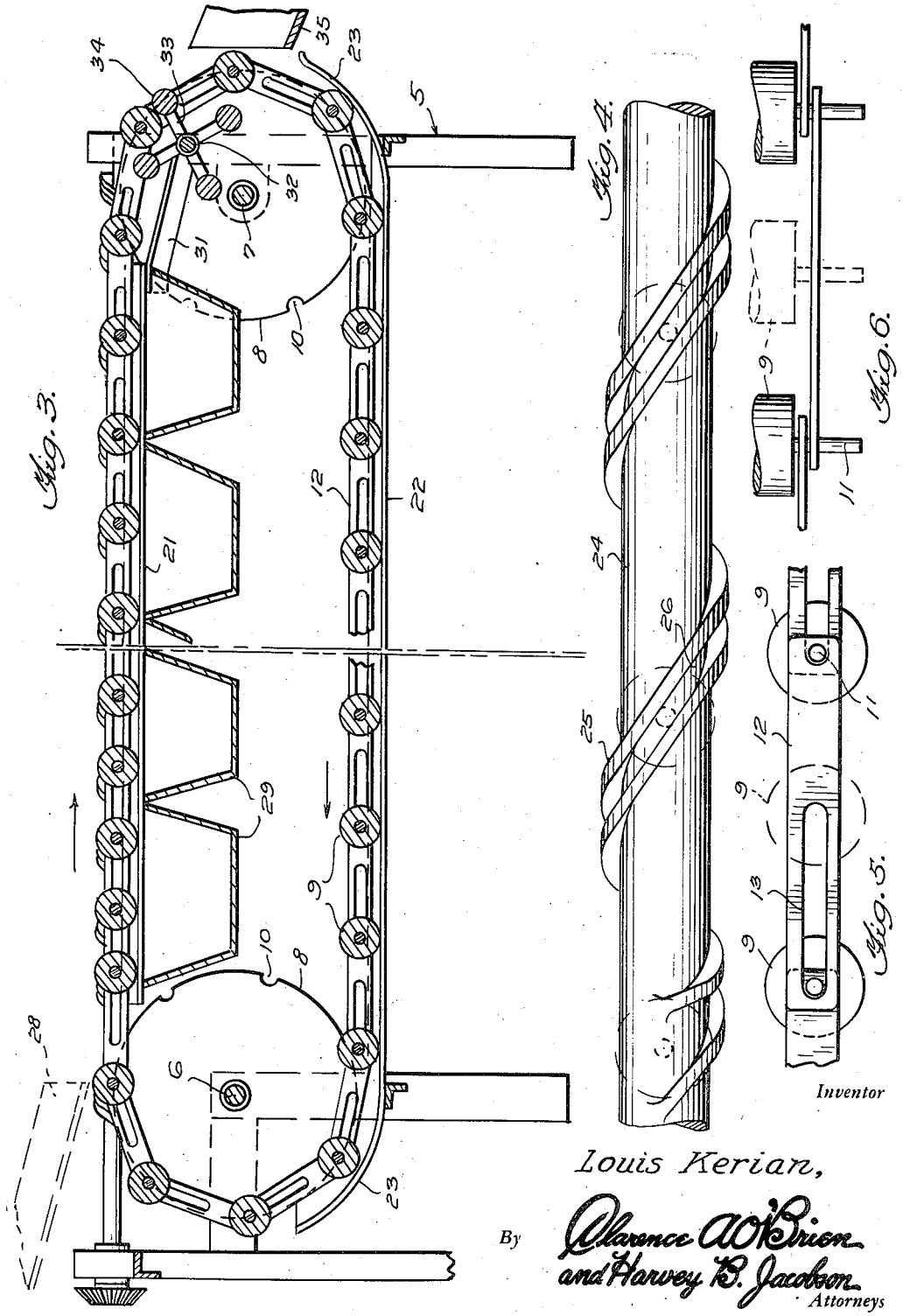

May 11, 1948.  L. KERIAN  2,441,154
SORTING MACHINE WITH ENDLESS CONVEYOR GAUGING SLOTS
Filed March 1, 1945  3 Sheets-Sheet 3
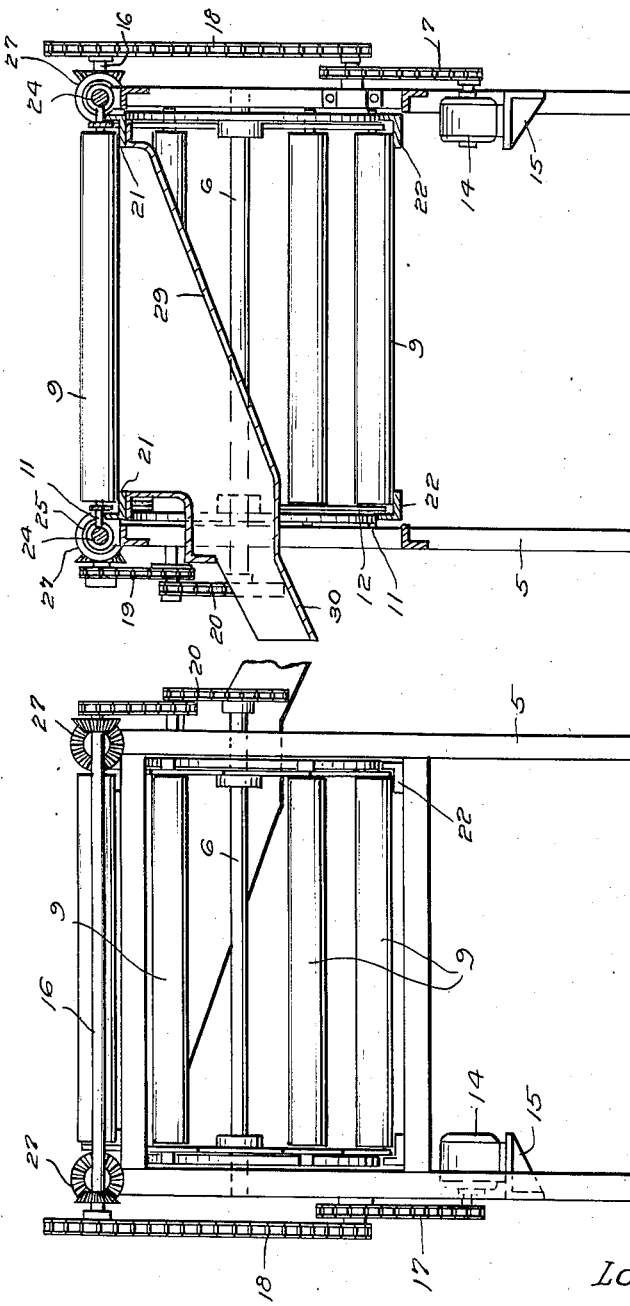
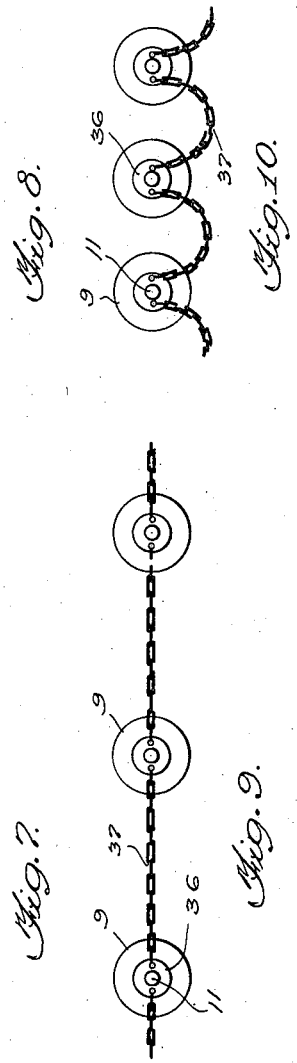
Inventor
Louis Kerian, Patented May 11, 1948

2,441,154

UNITED STATES PATENT OFFICE 2,441,154

SORTING MACHINE WITH ENDLESS CONVEYOR GAUGING SLOTS

Louis Kerian, Grafton, N. Dak.

Application March 1, 1945, Serial No. 580,337

1 Claim. (Cl. 209—106)

This invention relates to an improved sorting machine of the type disclosed in my copending application Serial No. 527,948, filed March 24, 1944, wherein a continuous series of horizontal rollers are moved in a horizontally elongated orbital path, and wherein the rollers are moved in the upper portion of said path by means of worm shafts whose threads gradually increase in pitch in the direction of movement of the rollers so as to gradually increase the spacing of the latter as they move from the receiving or feed end of the machine to the discharge end thereof.

An important object of the present invention is to provide a sorting machine of the above kind in which positive means is provided for moving the rollers from the worm shafts at the discharge end of the machine to said worm shafts at the receiving end of the machine.

Another object of the invention is to provide a sorting machine of the above kind embodying an endless sorting element and positive means for driving said sorting element, said sorting element including a continuous series of horizontal rollers and flexible means connecting said rollers for limited movement away from each other.

Still another object of the invention is to provide a sorting machine of the above kind in which means is provided for partially filling the spaces between adjacent rollers at the discharge end of the machine and thereby assisting in supporting the largest size of fruits and the like as they pass from the sorting element at the discharge end of the machine.

Still another object of the invention is to provide, in a sorting machine of the above kind, simple and efficient means for driving the endless sorting element and for supporting and guiding the rollers of said element as they travel in the upper and lower portions of the orbital path.

More specific objects and features of the present invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a top plan view of a sorting machine constructed in accordance with the present invention.

Figure 2 is a side elevation thereof, partly broken away.

Figure 3 is an enlarged longitudinal sectional view, partly broken away, and taken on the plane of line 3—3 of Figure 1.

Figure 4 is an enlarged fragmentary side elevation of one of the worm shafts.

Figure 5 is an enlarged fragmentary side elevation showing a portion of the endless sorting element.

Figure 6 is a top plan view of the construction shown in Figure 5.

Figure 7 is an end elevation, looking to the right of Figure 1.

Figure 8 is a transverse section taken on line 8—8 of Figure 2.

Figure 9 is a view similar to Figure 5 illustrating a modification of the invention.

Figure 10 is a view similar to Figure 9 showing the manner in which the flexible connections between the rollers of the sorting element permit said rollers to be moved toward each other to vary the spacing thereof.

Referring in detail to the drawings, the present sorting machine includes a suitable horizontally elongated frame 5 having transverse horizontal shafts 6 and 7 journaled at opposite ends thereof, each of said shafts having secured thereon a pair of spaced drive wheels 8 for an endless sorting element that includes a continuous series of transverse horizontal rollers 9. The drive wheels 8 are provided with a series of uniformly spaced peripheral notches 10, for a purpose which will presently become apparent. The rollers of the endless sorting element have projecting end spindles or shafts 11 that are adapted to be received within the peripheral notches 10 of the wheels 8 so as to provide a sprocket-like drive for said element, and the rollers 9 are serially connected by flexible means that permits free movement of the rollers toward or away from each other and limits the movement of said rollers away from each other to a distance corresponding to the distance between adjacent notches 10 of the wheels 8. The flexible connections between the rollers 9 may take any one of several forms, one of which is illustrated in Figures 5 and 6, and another of which is illustrated in Figures 9 and 10. As shown in Figures 5 and 6, links 12 are pivotally engaged at corresponding ends with the shafts 11 of each roller 9 and are provided in their other end portions with longitudinal elongated slots 13 which slidably receive the shafts 11 of a next adjacent roller 9, the slots 13 corresponding in length to the distance between adjacent notches 10 of the wheels 8. Thus, each roller 9 may move toward an adjacent roller or away from the same for a distance limited by the length of the slot 13.

A suitable motor 14 may be supported by a bracket 15 at one end of the frame 5 adjacent the shaft 6, and the motor 14 may be operatively connected to said shaft 6, as shown more clearly in Figures 1 and 7. As shown, a third transverse horizontal shaft 16 is journaled on the upper portion of frame 5 adjacent the shaft 6 and is operatively connected to the motor 14, at one end, by means of sprocket or belt reducer gearings 17 and 18. At its other end, the shaft 16 is operatively connected with the shaft 6 by means of sprocket or belt gearings 19 and 20.

Horizontal tracks 21 and 22 are carried by the frame 5 to respectively support the rollers 9 as they travel in the upper and lower portions of the orbital path, said tracks being arranged to have the ends of the rollers rest on the lower horizontal flanges thereof and including upstanding vertical flanges disposed at the outer sides of the links 12 to maintain them upon the shafts 11 of the rollers 9, as clearly indicated in Figure 8. The tracks 21 and 22 are of course disposed longitudinally of the frame, and the tracks 21 have their ends terminating at points where the rollers pass onto the same from the wheels 8 of the shaft 6 and from the same onto the wheels 8 of the shaft 7. The ends of the tracks 22 are curved upwardly about the outer lower portions of the wheels 8 of shaft 6 and 7, as indicated at 23, thereby effectively supporting the rollers and guiding them so that their shafts 11 will engage the notches of the wheels 8 on the shaft 6 and will remain in engagement with the notches of the wheels 8 on the shaft 7 as they pass under the latter wheels.

Worm shafts 24 are journaled longitudinally of the upper portion of frame 5 at the outer sides of the tracks 21, and these worm shafts are provided with threads 25 grooved at 26 to receive the ends of the shafts 11 of the rollers 9. The initial convolution of the thread 25 on each worm shaft 24 at the receiving end of the machine is of a pitch corresponding to the spacing of the notches 10 of the wheels 8, and from this initial convolution of the thread of each shaft 24, said thread has a beginning of fine pitch and gradually increases in pitch to the discharge end of the machine, as shown in Figures 1 and 2. The ends of the worm shafts 24 adjacent the transverse shaft 16 are operatively connected to the latter by bevel gearings 27. It will be seen that as the rollers pass from the wheels 8 of shaft 6, that shafts 11 will engage in the grooves 26 of the threads 25 of worm shafts 24 and will be moved to the discharge end of the machine so as to have a differential movement that results in gradually increasing the spacing of the rollers, as pointed out in my above-mentioned copending application. However, the fine end portions of the threads 25 of worm shafts 24 have several convolutions close together so that the rollers will be maintained in closely related position for a short period to retain the fruits or vegetables thereon for a limited time and permit picking of undesirable fruit or vegetables from the sorting element before actual sorting of the latter begins. However, as the rollers pass further on toward the discharge end of the machine, spacing of the rollers gradually increases and the vegetables or other objects of various sizes will be allowed to pass downwardly between the rollers at different points along the upper portion of the orbital path. Movement of the endless sorting element is positively effected at all times so that gravitation of the rollers is not depended upon for operation of the machine as in my above-mentioned copending application. The vegetables or other objects to be sorted may be fed onto the upper portion of the sorting element at the receiving end of the machine by suitable means such as a feed chute 28 indicated by dotted lines in Figures 2 and 3, and the direction of movement of the sorting element is clearly indicated by arrows in Figure 3.

Suitable transverse hoppers 29 are mounted beneath the upper portion of the sorting element to receive the respective sizes of objects which pass downwardly between the rollers 9 during the sorting operation. These hoppers have bottoms which incline toward one side of the machine and are provided at this side with discharge spouts 30 from which the objects pass into suitable receiving receptacles. Obviously, a bag holder may be associated with the discharge spout 30 of each receiving hopper as is common in the art, to facilitate bagging of the objects as they are sorted. Also, any suitable means may be provided to control the flow of the objects to the chutes 30 so that discharge of the sorted objects may be discontinued when desired, as when one filled bag is being substituted for an empty one. Any skilled mechanic is capable of supplying a suitable gate for controlling the flow of objects from each hopper 29 to its discharge spout 30, and specific illustration and description of such a means is deemed unnecessary herein.

Mounted in bearings of suitable supporting brackets 31 at the discharge end of the machine is a reel including a freely rotatable shaft 32 having radial arms 33 provided on the outer ends thereof with transverse cylindrical bars 34 so spaced as to successively pass between adjacent rollers 9 as they pass from the worm shafts 24 and around the wheels 8 of the shaft 7. This reel is rotated by engagement of the rollers 9 with the rods 34, each rod 34 being moved by the roller 9 directly behind the same, as illustrated in Figure 3. Thus, as the endless sorting element travels in its orbital path, successive rollers 9 passing from the worm shafts at the discharge end of the machine will engage successive rods 34 of the reel so as to rotate the latter. The rods 34 of this reel, being disposed between adjacent rollers 9, partially fill the spaces between such adjacent rollers and assist in sustaining the larger sizes of objects as they pass from the discharge end of the machine in a direction longitudinally of the latter. A suitable chute 35 may be provided at the discharge end of the machine to receive these largest size objects and direct them into a suitable collection receptacle.

In operation, the motor 14 is started, and the objects to be sorted are delivered onto the upper portion of the sorting element from the feed chute 28 at the receiving end of the machine. As the rollers pass from the wheels 8 of the shaft 6 into engagement with the worms of the worm shafts 24, the rollers will be positioned close together for a short period of time to permit picking of undesirable objects from the sorting element. Continued movement of the rollers toward the discharge end of the machine at the upper portion of the sorting element will result in differential movement of the rollers so that the spacing thereof is gradually increased. As this takes place, objects of various sizes will pass downwardly between adjacent rollers at different points along the upper portion of the orbital path, and these differently sized objects will be selectively received in different ones of the hoppers 29. Remaining still larger objects will pass from the rollers at the discharge end of the machine into the end chute 35, such largest size objects being partially supported by the rollers 9 and by the rods 34 of the reel at the discharge end of the machine, as said objects pass from the sorting element into the chute 35. When the rollers arrive at the discharge end of the machine, the worm shafts will have spaced them properly for engagement of their shafts 11 in the notches 10 of the wheels 8 on the shaft 7, and said shafts 11 will be at the outer ends of the slots 13 where the movement of the rollers away from each other is limited. Spaced in this manner, the rollers 9 pass downwardly around the wheels 8 of the shaft 7, then along the tracks 22 to the wheels 8 on the shaft 6, the shafts 11 of rollers 9 finally engaging in the notches 10 of said wheels 8 on shaft 6 and being carried upwardly by the latter wheels around the latter for ultimate engagement of their shafts 11 in the grooves 26 of the worm shafts 24 at the receiving end of the machine. It will thus be seen that a very compact and durable construction is had in which positive driving of the sorting element is effected at all times, thereby insuring continued efficient operation.

As shown in Figures 9 and 10, the link connections 12 may be dispensed with and different flexible connections substituted therefor. In these figures, the flexible connections between the rollers 9 include washers 36 engaged or placed on the shafts 11 of said rollers and serially connected by flexible elements or chains 37, the length of which is such that the maximum possible spacing of the rollers corresponds with the distance between adjacent notches 10 of the wheels 8. Due to the flexible nature of the connections 37, the rollers 9 may be freely moved toward or away from each other and movement of said rollers away from each other is properly limited. Other forms of suitable flexible connections between the rollers, which will permit and properly limit their relative movement relative to each other, may suggest themselves to those skilled in the art.

From the foregoing description, it is believed that the construction and operation, as well as the advantages of the present invention, will be readily understood and appreciated by those skilled in the art. Minor changes in details of construction illustrated and described are contemplated, such as fairly fall within the spirit and scope of the invention as claimed.

What I claim is:

In a sorting machine of the character described, a horizontally elongated frame having transverse horizontal shafts journaled at opposite ends thereof, a pair of similar spaced drive wheels secured on each of said shafts, each drive wheel being provided with a series of uniformly spaced peripheral notches, an endless sorting element passing around said drive wheels and comprising a continuous series of transverse horizontal rollers having projecting end spindles adapted to be received in the notches of the drive wheels, flexible elements serially connecting said rollers for free movement of the latter toward and away from each other, variable pitch worm shafts receiving the end spindles of said rollers for progressively increasing the spacing of said rollers in the top run of said sorting element as it moves from one end of the frame to the other, and means for driving said worm shafts and one of said transverse shafts, the drive wheels of said one transverse shaft acting to successively move the rollers to engage their end spindles with the worm shaft at one end of the machine.

LOUIS KERIAN.

REFERENCES CITED

The following references are of record in the file of this patent:

UNITED STATES PATENTS

| Number | Name | Date |
| --- | --- | --- |
| 1,489,585 | Tinklepaugh | Apr. 8, 1924 |
| 1,868,356 | Helenbolt | July 19, 1932 |
| 1,874,096 | Ghent | Aug. 30, 1932 |

FOREIGN PATENTS

| Number | Country | Date |
| --- | --- | --- |
| 423,149 | Great Britain | Jan. 25, 1935 |
| 38,081 | The Netherlands | Apr. 17, 1936 |
| 159,600 | Switzerland | Apr. 1, 1933 |